United States Patent
Brown et al.

(10) Patent No.: US 6,279,035 B1
(45) Date of Patent: *Aug. 21, 2001

(54) OPTIMIZING FLOW DETECTION AND REDUCING CONTROL PLANE PROCESSING IN A MULTI-PROTOCOL OVER ATM (MPOA) SYSTEM

(75) Inventors: Brian Brown, Santa Cruz; Jeanne Haney, Saratoga; James Mangin, San Ramon; Derek H. Pitcher, Saratoga; Kishore K. Seshadri, Redwood City, all of CA (US)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,693

(22) Filed: Apr. 10, 1998

(51) Int. Cl.[7] .................................................. G06F 13/00
(52) U.S. Cl. .......................... 709/224; 709/228; 370/412
(58) Field of Search .................................. 370/401, 412, 370/230; 709/224, 228, 245

(56) References Cited

U.S. PATENT DOCUMENTS

| | | | |
|---|---|---|---|
| 5,600,820 | * | 2/1997 | Johnston ............................... 709/224 |
| 5,828,844 | * | 10/1998 | Civanlar et al. ...................... 709/228 |
| 5,878,043 | | 3/1999 | Casey .................................... 370/397 |
| 5,892,924 | * | 4/1999 | Lyon et al. ............................ 709/245 |
| 5,920,705 | * | 7/1999 | Lyon et al. ............................ 709/245 |
| 5,926,459 | * | 7/1999 | Lyles et al. ........................... 370/320 |
| 5,949,786 | * | 9/1999 | Bellenger .............................. 370/401 |

OTHER PUBLICATIONS

"Multi–Protocol Over ATM Version 1.0", The ATM Forum Technical Committee, AF–MPOA–0087.000, Jul. 1997, p. 1–154.

* cited by examiner

Primary Examiner—Ayaz Sheikh
Assistant Examiner—Khanh Quong Dinh
(74) Attorney, Agent, or Firm—Blakely Sokoloff Taylor & Zafman LLP

(57) ABSTRACT

A method and apparatus for reducing the amount of control plane processing and flow detection required in a Multiprotocol Over ATM (MPOA) system are provided. According to one aspect of the present invention, flow detection processing may be altered based upon a packet's content. A first MPOA client (MPC) may include a plurality of flow detection mechanisms including standard MPOA processing and modified flow detection processing. For example, a flow may be determined to exist when the number of packets to a particular destination within a predetermined time interval exceeds a threshold value. Alternatively, a flow may be determined to exist immediately for certain types of traffic and detection of a flow may be suppressed for other types of traffic. Upon receipt at a first MPC, traffic may be classified based upon any information contained within a packet, including the header, the payload, or portions and/or combinations thereof. Based upon the packet's content, the MPC then selects among the plurality of flow detection mechanisms for purposes of determining whether or not a flow exists. According to another aspect of the present invention, control plane processing may be managed based upon a packet's content. A first MPC determines whether or not a stream of data with which a packet is associated justifies establishing a shortcut between the first MPC and the MPC with which the target is associated. After determining that the shortcut is justified, the first MPC allows or disallows the transmission of a resolution request based upon the packet's content.

36 Claims, 7 Drawing Sheets

OPTIMIZING FLOW DETECTION AND REDUCING CONTROL PLANE PROCESSING IN A MULTI-PROTOCOL OVER ATM (MPOA) SYSTEM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of computer networking. More particularly, the invention relates to a flexible mechanism for reducing the amount of control plane processing and flow detection required in a Multi-protocol Over ATM (MPOA) system.

2. Description of the Related Art

With the emergence and growing popularity of Internet, intranet, client/server and multimedia applications, an increasing percentage of network traffic is now traversing subnet boundaries. Additionally, today's networks typically include a number of Local Area Networks (LANs) implementing diverse protocols. In response to these trends, the Asynchronous Transfer Mode (ATM) Forum Technical Committee has published the Multi-Protocol Over ATM (MPOA) specification, Multi-Protocol Over ATM Version 1.0, AF-MPOA-0087.000, published July 1997 (hereinafter "MPOA," "the MPOA protocol," or "the MPOA specification"). A network viewed at the ATM layer, allows any switch with an ATM interface to directly establish a circuit or connection to any other switch connected to the same ATM network. Higher level protocol traffic is typically constrained to flow through a router when crossing subnet boundaries. MPOA removes this constraint for the most part by efficient use of ATM circuits. MPOA facilitates the transfer of inter-subnet data by providing a framework in which internetwork layer protocols and other mechanisms for communicating across subnet boundaries, such as Internet Protocol (IP), IPv6, Internetwork Packet Exchange (IPX), DECnet routing, CLNP, AppleTalk, DDP, Vines, SNA, etc., may be efficiently overlaid on top of ATM.

Generally, the MPOA protocol provides a mechanism that greatly increases the efficiency of steady stream transmissions across subnet boundaries by identifying "flows" (e.g., a uni-directional flow of data packets to a single destination internetwork layer address) and mapping them onto ATM virtual channels. After detecting a flow, the MPOA protocol establishes a path called a "shortcut," an ATM virtual channel connection (VCC), upon which data packets associated with the flow may be forwarded to avoid the hop-by-hop processing typically performed by intermediate routers along the "default path."

A simplified MPOA system 100 is illustrated by FIG. 1. The MPOA system 100 includes edge devices 110 and 140, e.g., network devices, such as LAN-to-ATM switches or other MPOA devices, that are directly connected to an ATM cloud 150 and LAN hosts and/or LAN segments. The MPOA system 100 of the present example also includes one or more intermediate network devices, such as routers 120 and 130, between edge devices 110 and 140. It is appreciated that additional intermediate network devices, such as ATM switches and routers, may be located on the data path between router 120 and router 130.

Edge devices 110 and 140 include LAN emulation clients (LECs) 114 and 144, respectively and MPOA clients (MPCs) 112 and 142, respectively. LECs perform forwarding in accordance with the ATM Forum's LAN Emulation Over ATM specification. Typically, network devices have a LEC for each emulated LAN (ELAN) interface. MPCs are MPOA protocol entities that implement the client side of the MPOA protocol. MPCs typically perform such functions as flow threshold detection, shortcut resolution, cache imposition request processing and handling of packets that arrive via a shortcut, each of which are described further below.

Routers 120 and 130 each include MPOA protocol entities that implement the server side of the MPOA protocol, MPOA server (MPS) 122 and 132, respectively. For example, the MPSs are responsible for maintaining and distributing knowledge of the topology of the network. Additionally, the routers 120 and 130 include LECs 124, 126, 134, 136 for the ELAN interfaces.

For purposes of this example, edge device 110 is assumed to be the point at which a stream of data enters the MPOA system 100 and edge device 140 is the point at which the flow exits the MPOA system 100. For example, end-station 116 coupled to a LAN port (not shown) of edge device 110 may be transmitting packets to end-station 146 coupled to a LAN port (not shown) of edge device 140. Further, this example assumes that end-stations 116 and 146 are on different subnets. Therefore, MPC 112 operates in its role as an Ingress MPC (I-MPC), MPS 122 operates in its role as an Ingress MPS (I-MPS), MPS 132 operates in its role as an Egress MPS (E-MPS), and MPC 142 operates in its role as an Egress MPC (E-MPC).

An Ingress Cache (I-Cache) 170 is maintained by MPC 112 for purposes of detecting inbound flows and keeping track of the shortcut VCC and encapsulation information (e.g., the LLC header to prepend to a packet before sending it on the shortcut) for those flows. Typically, an inbound flow is determined to exist once the MPC counts a predetermined number of packets addressed to a specific end-station within a predetermined time interval. In this example, the MPC 112 performs flow threshold detection by creating I-Cache entries and keeping packet counts for each MPS/IP address pair.

An Egress Cache (E-Cache) 180 is maintained by MPC 142 to facilitate handling of packets received on shortcuts that are to be forwarded on an outbound LAN port. E-Cache entries include, among other things, encapsulation information (e.g., the outbound DLL header to prepend to the packet before sending it to the outbound port). Encapsulation information is entered into the E-Cache 180 at the direction of the E-MPS 132 by way of a Cache Imposition Request protocol data unit (PDU) 182.

While for purposes of explanation, MPOA protocol entities are depicted as residing on separate devices, it is appreciated that two or more MPOA protocol entities may be co-located. A LAN-LAN flow, for example, may involve two MPCs that reside on the same edge device, one serving as the Ingress MPC and the other as the Egress MPC. Additionally, a single MPOA protocol entity may assume the role of both an ingress and an egress for a particular transmission path. For instance, edge devices 110 and 140 might be separated by only a single router 120 or 130, in which case, the MPS 122 or 132 would perform both ingress and egress MPS functions for data packets sourced at end-station 116 for end-station 146. Further, it is important to note that MPOA protocol entities are logical rather than physical entities and therefore may span one or more physical devices.

Exemplary MPOA protocol scenarios and associated data and control plane processing will now be briefly described. Initially, the I-Cache 170 and E-Cache 180 have no entries. Upon receiving a first packet at edge device 110 that is destined for end-station 146 (i.e., a packet containing the internetwork address of end-station 146 and the MAC address of router 120), an entry 171 is created in the I-Cache 170 and a packet count for this path is initialized to 1. The first packet destined for end-station 146 is forwarded via normal LANE procedures through LEC 114 over the default path (i.e., the hop-by-hop path from router 120 to router 130 as determined by routing protocols). Subsequent data packets destined for end-station 146 cause the packet count associated with the MAC/internetwork address pair to be incremented. That is, each packet being sent to an MPS is tallied by its destination internetwork address. These subsequent packets continue to be forwarded over the default path until an inbound flow is detected. A "flow" is said to be detected when the number of packets to a destination within a predetermined time interval exceeds a threshold value. After an inbound flow is detected, the I-MPC 112 seeks to establish a shortcut 165 to the Egress MPC serving IP destination 146. The technique of establishing shortcuts directly across an ATM network (also referred to as "shortcut resolution") involves the exchange of information in the form of MPOA requests and replies between MPCs and MPSs. MPSs communicate with each other via the Next Hop Resolution Protocol (NHRP) and convert between MPOA requests and replies and NHRP requests and replies on behalf of the MPCs. In FIG. 1, I-MPC 112 and I-MPS 122 exchange Resolution Request/Reply PDUs 172 and 174 in order to add the appropriate shortcut encapsulation information for the detected flow to the I-Cache 170. Shortcut resolution additionally includes the exchange of Cache Imposition Request/Reply PDUs 182 and 184 by E-MPS 132 and E-MPC 142 to add corresponding outbound encapsulation information to the E-Cache 180. When shortcut resolution is successful, corresponding entries containing necessary shortcut information are stored in the I-Cache 170 and E-Cache 180 for the flow. After an inbound flow has been detected and a shortcut has been resolved, a VCC is established between the edge devices 110 and 140 and subsequent packets destined for end-station 146 are sent over the shortcut, thereby reducing latency and avoiding hop-by-hop processing by the routers of ATM cloud 150. Further information regarding MPOA and more detailed scenarios are available in the MPOA specification cited above.

While MPOA attempts to optimize large scale, multiprotocol networks that are connected together with ATM, several limitations remain. For instance, MPOA does not provide a mechanism for prioritizing or distinguishing between flows. All flows are treated the same by the MPOA protocol. Therefore, a significant amount of processing (e.g., control plane processing, such as Resolution Request/Reply PDUs and Cache Imposition Request/Reply PDUs, and flow detection processing, including the update, creation, and maintenance of cache entries) may be performed to optimize traffic the network administrator would rather not optimize or which may not even be optimizable. Additionally, valuable cache space is consumed by these unwanted shortcuts which may prevent successful shortcut resolution (due to insufficient cache space) for other possible candidate flows that may carry higher priority traffic or whose optimization might otherwise be more beneficial. Moreover, this MPOA approach may interfere with network security. For example, a shortcut may allow a firewall established by the network administrator to be bypassed.

BRIEF SUMMARY OF THE INVENTION

A flexible mechanism for reducing the amount of control plane processing and flow detection required in a Multiprotocol Over ATM (MPOA) system is described. According to one aspect of the present invention, flow detection processing may be altered based upon a packet's content. A packet is received at a first MPOA client (MPC). The MPC includes a plurality of flow detection mechanisms including standard MPOA processing and modified flow detection processing. Based upon the packet's content, the MPC selects among the plurality of flow detection mechanisms. Advantageously, in this manner, a network administrator may retain control over the manner in which data is transferred throughout the network and may reduce and/or expedite establishment of flows for particular types of traffic.

According to another aspect of the present invention, control plane processing may be managed based upon a packet's content. A first MPC determines whether or not a stream of data with which a packet is associated justifies establishing a shortcut between the first MPC and the MPC with which the target is associated. After determining that the shortcut is justified, the first MPC allows or disallows the transmission of a resolution request based upon the packet's content. Thus, shortcut resolution and virtual channel connection establishment can be avoided for traffic the network administrator would rather not optimize.

Other features of the present invention will be apparent from the accompanying drawings and from the detailed description which follows.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
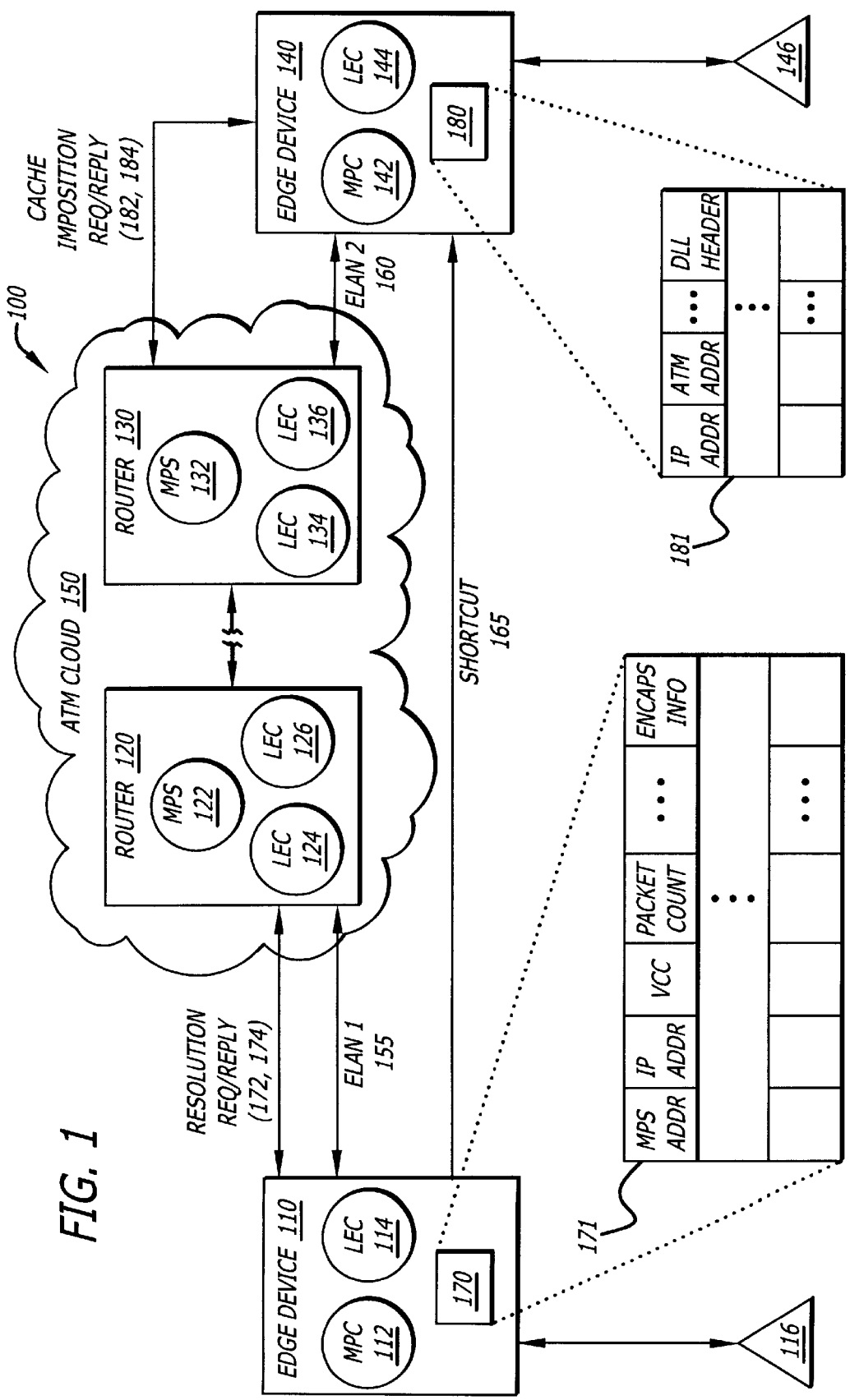
FIG. 1 illustrates a Multiprotocol Over ATM system.

A flexible mechanism for reducing the amount of control plane processing and flow detection required in a Multiprotocol Over ATM (MPOA) system is described. According to various embodiments of the present invention, a network administrator may provide a set of rules, conditions, or filters in a verification table to modify the standard flow threshold detection and/or shortcut resolution processing based upon a packet's contents. For example, the verification table may be employed to determine if shortcut resolution is to be carried out as usual, accelerated or bypassed for traffic meeting one or more criteria in the table. According to one embodiment, an MPOA protocol entity, such as an MPOA Client (MPC) or MPOA Server (MPS) is caused to inspect the verification table and evaluate any rules, conditions and/or filters that may apply to a packet being processed. Preferably, this verification step is prior to flow threshold detection or after a flow has been detected but prior to initiating an MPOA control message, such as a Resolution Request/Reply protocol data unit (PDU) or a Cache Imposition Request/Reply PDU. In this manner, the network administrator retains control over the manner in which data is transferred throughout the network and may reduce and/or expedite MPOA control plane processing for particular types of traffic. For example, the network administrator may cause certain types of traffic, such as those that have a tendency to be long term flows (e.g., file transfers via File Transfer Protocol (FTP)), to be immediately recognized as flows. Additionally, the network administrator may define the verification table so as to prevent certain users, applications, and/or types of traffic from receiving the benefit of a shortcut path. For instance, certain destination addresses may be defined as "L2 only," thereby avoiding unnecessary flow detection and MPOA control plane processing and forcing traffic to such destination addresses through the routers. By employing various aspects of the present invention, therefore, the network administrator retains control over the types of traffic that will be optimized (e.g., intracampus traffic, traffic destined to off campus destinations, etc.) and in addition may preserve network security in an MPOA system.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software. Importantly, while embodiments of the present invention will be described with reference to a particular LAN-to-ATM switch architecture employing an ATM cell switching backplane, the method and apparatus described herein are equally applicable to other switch architectures and other types of network devices, such as routers, bridges, and the like.

An Exemplary Switching Device Architecture

Figure 2:
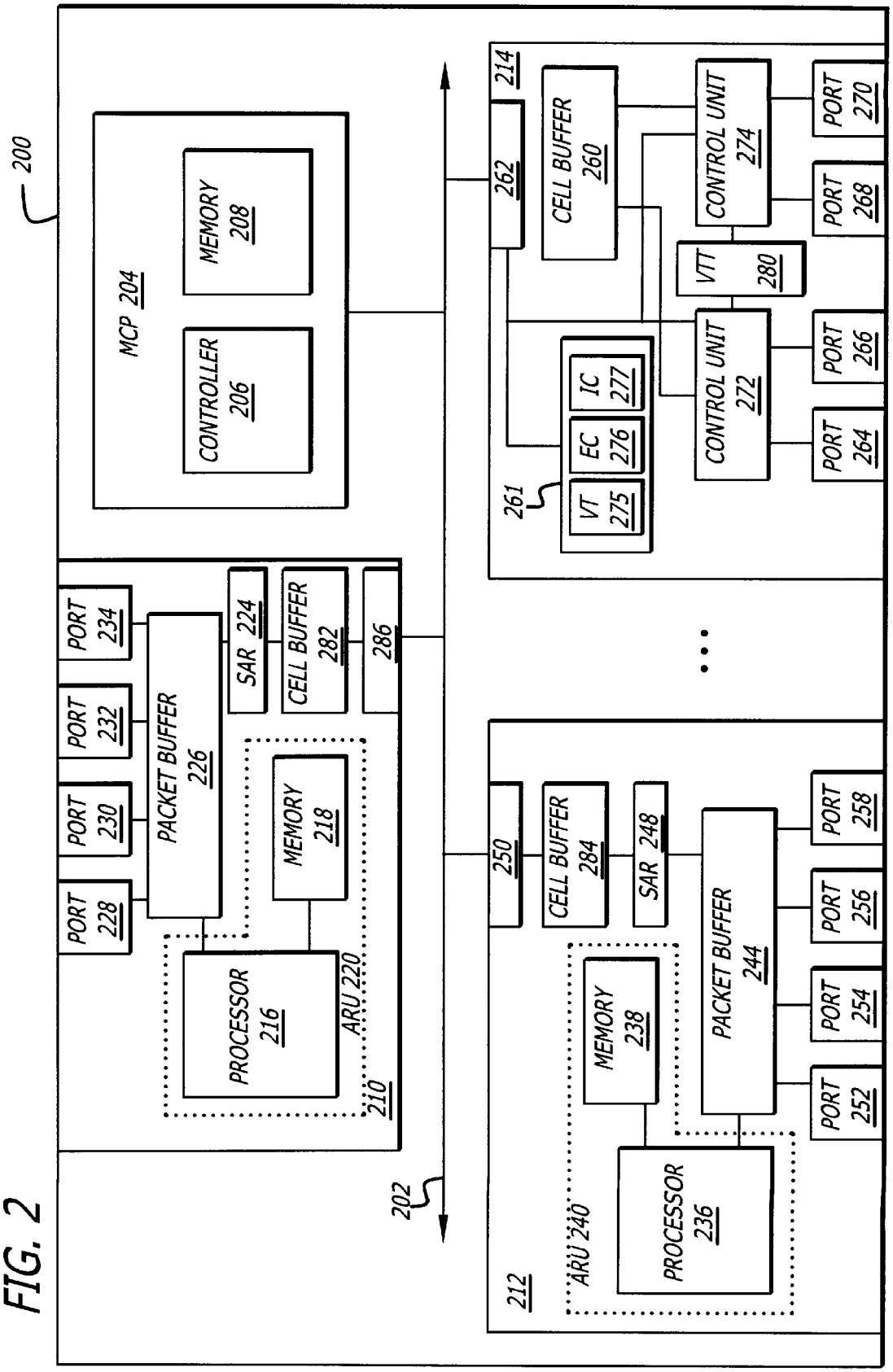
FIG. 2 is a simplified block diagram of a network device in which an embodiment of the present invention may be implemented.

According to one embodiment of the present invention, one or more of the edge devices 110 and 140 may be Centillion 100™ LAN-to-ATM switches or EtherCell™ or System 5000BH Ethernet-to-ATM edge devices, all of which are available from Bay Networks, Inc. of Santa Clara, Calif. (EtherCell™ and Centillion 100™ are trademarks or registered trademarks of Bay Networks, Inc.). An overview of the architecture of a network device 200 in which an embodiment of the present invention may be implemented is illustrated by FIG. 2. Switching device 200 includes a common backplane 202 to which multiple switching interface cards may be connected. In the embodiment depicted, the common backplane 202 is an ATM cell switching backplane. However, the switching interface cards do not themselves have to be ATM interface cards. Any type of network interface card may used as long as circuitry is provided for converting data from the format supported by the interface cards to the format supported by the common backplane 202. Further, any number and combination of interface cards may be present. The various interface cards (modules) may support, for example ATM, Ethernet (or other CSMA/CD protocols), FDDI and Token Ring networks. In the illustrated embodiment, two LAN interface cards 210 and 212 and one ATM interface card 214 are connected to the common backplane 202 in switching device 200. Each switch module has multiple I/O interfaces, i.e., ports, and switching logic that switches traffic among the local I/O ports.

Because backplane 202 is an ATM backplane, all data moving over the backplane 202 is in the form of ATM cells. All packet data received by non-ATM interface cards, such as LAN interface cards 210 and 212, must be segmented into cells when entering the backplane 202 and re-assembled into packets when leaving the backplane 202 for packet transmission.

Consequently, LAN interface cards 210 and 212 include circuitry for performing segmentation and reassembly. Specifically, cards 210 and 212 respectively include packet buffers 226 and 244 connected to their respective ports. Both incoming and outgoing packets may be temporarily stored in these packet buffers.

If a packet received from an external source is to be transmitted to one or more ports on one or more other interface cards, then a Segmentation And Reassembly circuit (SAR) encapsulates the data from the packet into ATM cells, which are then stored in a cell buffer. Similarly, data received from other cards is encapsulated in ATM cells. Packet-based cards, such as LAN interface cards 210 and 212 must extract the appropriate information from the cells, which are stored in the cell buffer, and encapsulate the data in a packet constructed in the packet buffer.

Cards 210 and 212 respectively include SARs 224 and 248 which are respectively connected between packet buffers 226 and 244 and cell buffers 282 and 284. Cell buffers 282 and 284 are respectively coupled to backplane 202 through backplane interfaces 286 and 250. In the illustrated embodiment, address resolution processing and flow threshold detection processing is performed on cards 210 and 212 by address resolution units (ARUs) 220 and 240. The ARUs 220 and 240 respectively include processors 216 and 236 which are coupled to memories 218 and 238 respectively. Importantly, in alternative embodiments, the ARUs 220 and 240 are state machines that may be implemented in any programmable or hardcoded logic, such as an FPGA, TTL logic, or an application specific integrated circuit (ASIC).

According to one embodiment, communications between backplane 202 and cards 210 and 212 are performed as disclosed in U.S. patent application Ser. No. 08/501,537, entitled "A LAN/ATM Switch Having Local Packet Switching And An ATM Core Fabric" filed on Jul. 12, 1995, and U.S. patent application Ser. No. 08/501,454, entitled "Method And Apparatus For Transmitting Cells Across An ATM Switch Bus", both filed on Jul. 12, 1995, and assigned to the assignee of the present invention. Importantly, however, the present invention is not limited to a particular implementation of the common backplane 202 or the cards 210 and 212.

The data received by ATM card 214 from external sources is encapsulated in the form of ATM cells. Consequently, ATM card 214 does not need to perform packet-to-cell conversions prior to sending data over ATM backplane 202 to other cards within device 200. ATM card 214 includes control units 272 and 274 coupled between its ports and a cell buffer 260. A VTT 280 is coupled between control unit 272 and control unit 274. The cell buffer 260 is coupled to the ATM backplane 202 through an interface 262. The ATM card 214 additionally includes a memory 261 which may store various tables, including a configurable verification table (VT) 275, an Egress Cache (EC) 276, and an Ingress Cache (IC) 277. While in the present embodiment, these tables are illustrated as being contained within memory 261, in alternative embodiments, one or more of the tables or portions of the tables may be distributed across other memories in the switch device 200 or the tables may be embodied in hardware. The verification table 275 may be populated manually by the network administrator, for example, or through support in the LECs, MPCs and/or MPSs.

Switching device 200 includes a master control processor (MCP) 204. In this embodiment, the MCP 204 includes a controller 206 and a memory 208 for controlling the flow of information within switching device 200. The data transfers that occur between interface cards within switching device 200 included three general types of traffic. Data that is sent between packet switching interfaces (e.g., data sent from LAN interface card 210 to LAN interface card 212) is referred to as LAN-to-LAN traffic. Data that is sent between a packet switching interface and a cell switching interface (e.g., data sent from LAN interface card 210 and ATM interface card 214) is referred to as LAN-to/from-ATM traffic. Data that is sent between two cell switching interfaces is referred to as ATM-to-ATM traffic. The MCP 204 may also perform various verification processing, which is discussed further below, to evaluate a packet with reference to one or more predetermined criteria for purposes of determining whether or not a stream of data associated with the packet justifies establishing a shortcut.

Although, the present embodiment shows memory 261 containing the verification table 275, the Egress Cache 276, and the Ingress Cache 277, memory 208 may alternatively store these tables or the tables may be distributed among one or more of the memories 261, 218, 244, and 208. In one embodiment, ingress/egress caches are maintained in the ARUs 240 and 220 of cards 212 and 210, respectively, while the verification table 275 resides in memory 208. In alternative embodiments, one or more of the tables 275, 276, and 277 may be maintained by control circuitry (hardware) or a combination of hardware and software. Controller 206 generally represents control circuitry used to construct and maintain various tables, such as forwarding tables, within memory 208, and to control the flow of data within device 200 based on those tables. Controller 206 may be implemented with hardwired circuitry, or by causing a processor to execute instructions. The present invention is not limited to a particular implementation of controller 206. Further, MCP 204 is illustrated separate from cards 210, 212 and 214 for the purposes of explanation. However, MCP 204 may actually reside on one of the interface cards, or be distributed among the various interface cards. Similarly, the MPCs, e.g., 112 and 142, may be located separately from cards 210, 212 and 214, on card 204, or distributed among them.

Traffic Classification/Verification Processing

The MPOA specification is deficient in several respects. As mentioned above, apart from destination/target, MPOA does not provide a mechanism for distinguishing between flows. As a result, MPOA protocol entities treat all flows as equally important and shortcuts are resolved in the order that flows are detected. Often this is not the most beneficial allocation of the limited cache entries available in the Ingress-/Egress-Caches. MPOA further raises network security issues because packets forwarded over a shortcut VCC are not processed by intermediate routers. Therefore, filters and other qualification criteria employed by the routers on the default path are effectively bypassed by these packets. For security purposes, a network administrator may wish to extend security screening down into the switch, for example, to maintain control over the types of traffic that are forwarded. In light of the foregoing and other reasons (e.g., quality of service), it is desirable to provide network administrators with the ability to identify particular flows for special treatment.

A distinctive feature provided by various embodiments of the present invention allows traffic to be classified based upon any information contained within a packet, including header and/or payload information. The information used to identify a particular flow for special treatment will typically depend upon policy and security considerations and/or the priorities for a particular network. For example, the network administrator may want to prevent a particular user or group of users from being able to bypass established router filters. Additionally, a network administrator may find it advantageous to optimize network traffic within the campus or within a particular domain while suppressing shortcut establishment to off-campus or off-domain destinations, for example. According to one embodiment, this level of flexibility is achieved by providing an additional layer of packet filtering to MPC processing.

Figure 3A:
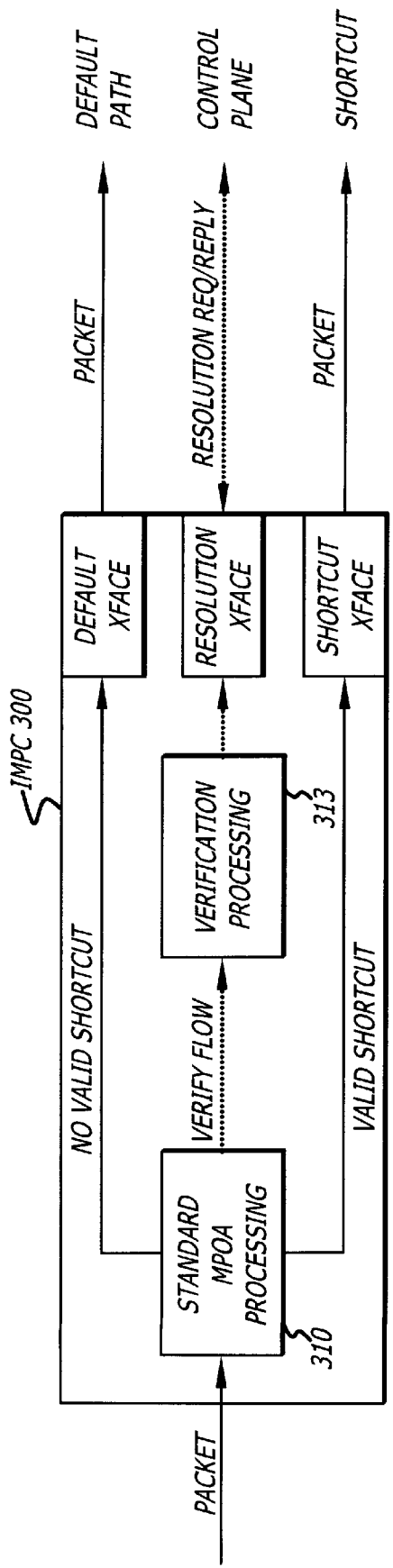
FIG. 3A is a block diagram that conceptually illustrates data and control flow between various Ingress MPOA Client processing blocks according to one embodiment of the present invention.

Referring to FIG. 3A, the interaction between various Ingress MPOA Client processing blocks according to one embodiment of the present invention will now be described. In the embodiment depicted, I-MPC 300 includes two levels of filtering, standard MPOA processing 310 and additional verification processing 313, before shortcut resolution and VCC establishment may commence. The standard MPOA processing 310 includes, among other things, logic for performing flow threshold determination, and logic for forwarding packets to their destination over the appropriate path, such as that described in the MPOA specification. However, rather than performing shortcut resolution for every flow detected by the standard MPOA processing 310, an additional layer of filtering is performed by the verification processing 313. Verification processing 313 may include supplemental checks that suppresses shortcut resolution and VCC establishment for certain types of traffic while allowing other types of traffic to setup shortcut VCCs.

In one embodiment, the verification processing 313 may be configured by the network administrator providing a set of rules, conditions and/or filters in the form of a table or other data structure (referred to as a verification table). In this manner, when more or less filtering is desired, the network administrator may simply supply an updated verification table. For example, internetwork addresses or ranges of addresses may be placed in the verification table to indicate internetwork addresses to or from which traffic may or may not be optimized. If the verification table is structured as an "inclusion table," those addresses, destination Internet Protocol (IP) addresses or other types of internetwork addresses, for example, which are approved for shortcut establishment are stored in entries of the verification table, while those addresses which are not to be optimized are omitted from the verification table. It is appreciated that in some circumstances the set of rules to be employed for traffic classification may be more easily or compactly expressed as an "exclusion table." If this is the case, then those packets meeting the one or more criteria established by the verification table are prohibited from establishing shortcuts and those packets that do not meet the criteria may establish shortcuts. Importantly, the word "table" is used to broadly refer to any type of logical or physical collection of data, such as a software data structure (e.g., an array, linked list, tree, or the like) or hardware memory (e.g., random access memory (RAM) or other dynamic storage). The underlying implementation of such a table is not important; however, preferably the table provides a means for organizing and relating data for purposes of efficient storage and retrieval.

An alternative or a more generic approach to the inclusion/exclusion table approach is to provide a mapping between traffic classifications and a set of actions. In this manner, more granularity may be achieved. Rather than having essentially two classifications, one classification for which a predetermined action is performed (e.g., shortcut resolution) and another classification for which the action is not performed, the traffic classifications may identify traffic that is to receive immediate or accelerated shortcut resolution and VCC establishment, traffic that should never be cut-through, traffic that is to be processed by the standard MPOA approach, or traffic that is to bypass one or more steps of the standard MPOA processing, etc.

Figure 3B:
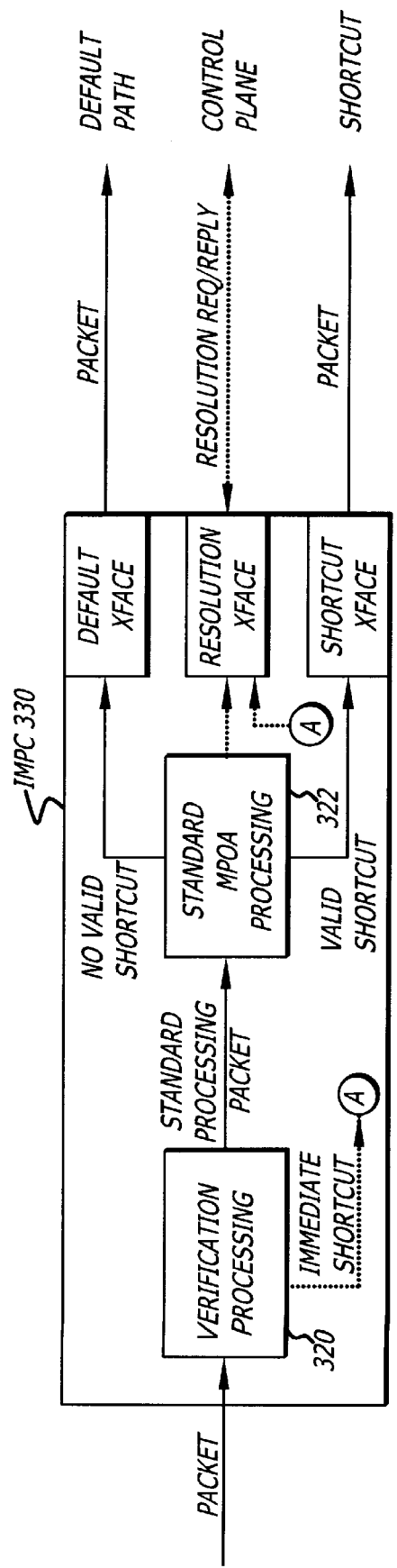
FIG. 3B is a block diagram that conceptually illustrates data and control flow between various Ingress MPOA Client processing blocks according to another embodiment of the present invention.

Another potential arrangement of Ingress MPOA Client processing blocks is illustrated by FIG. 3B. Packets received by the I-MPC 330 are first input into a verification process 320. The verification process 320 may select one of a plurality of paths through the remainder of the I-MPC processing based upon the packet's contents. In this manner, a plurality of flow detection mechanisms may be provided. For example, some types of traffic may be handled by standard MPOA processing 322 while other types of traffic may bypass the standard MPOA processing 322 and immediately establish a flow. Still other types of traffic may bypass the standard MPOA processing 322 without ever establishing a flow. Traffic classification criteria employed by the verification processing 320 to determine whether or not a packet is in a particular traffic class may be simple or complex depending upon the flexibility and granularity desired. Further, multiple criteria may be logically combined in various manners. In this manner, the network administrator may define traffic classes that optimize transfers of certain types of data (e.g., voice, video, multimedia, etc.) while constraining the situations in which these types of data transfers are optimized (e.g., only for particular IP subnets, individual end-station addresses, etc.). Similarly, a network administrator may define a set of rules that immediately cuts through File Transfer Protocol (FTP) sessions, for example, and only HyperText Transport Protocol (HTTP) requests to/from destination/source IP addresses within a particular domain.

Importantly, the verification processing discussed herein may be employed to make forwarding/filtering decisions in addition to decisions with respect to flow threshold detection and shortcut resolution processing. For example, a verification table may include filters that may be used in lieu of or in addition to conventional routing filters. Additional methods for constructing and applying filters are described in copending U.S. patent application Ser. No. 08/538,921, entitled "Method And Apparatus For Processing Data Packets In A Network" filed on Oct. 4, 1995, which is hereby incorporated by reference.

It should be noted that the above mentioned traffic classification mechanisms are merely an exemplary set of traffic classification systems to illustrate the flexibility provided by embodiments of the present invention. From the examples presented herein, additional, alternative, and equivalent traffic classification schemes will be apparent to those of ordinary skill in the art. For example, other information may be useful for purposes of determining an MPOA protocol entity's behavior, such as the history of previous packets, the previous traffic load, the time of day, etc.

Ingress MPC Packet Processing

Figure 4A:
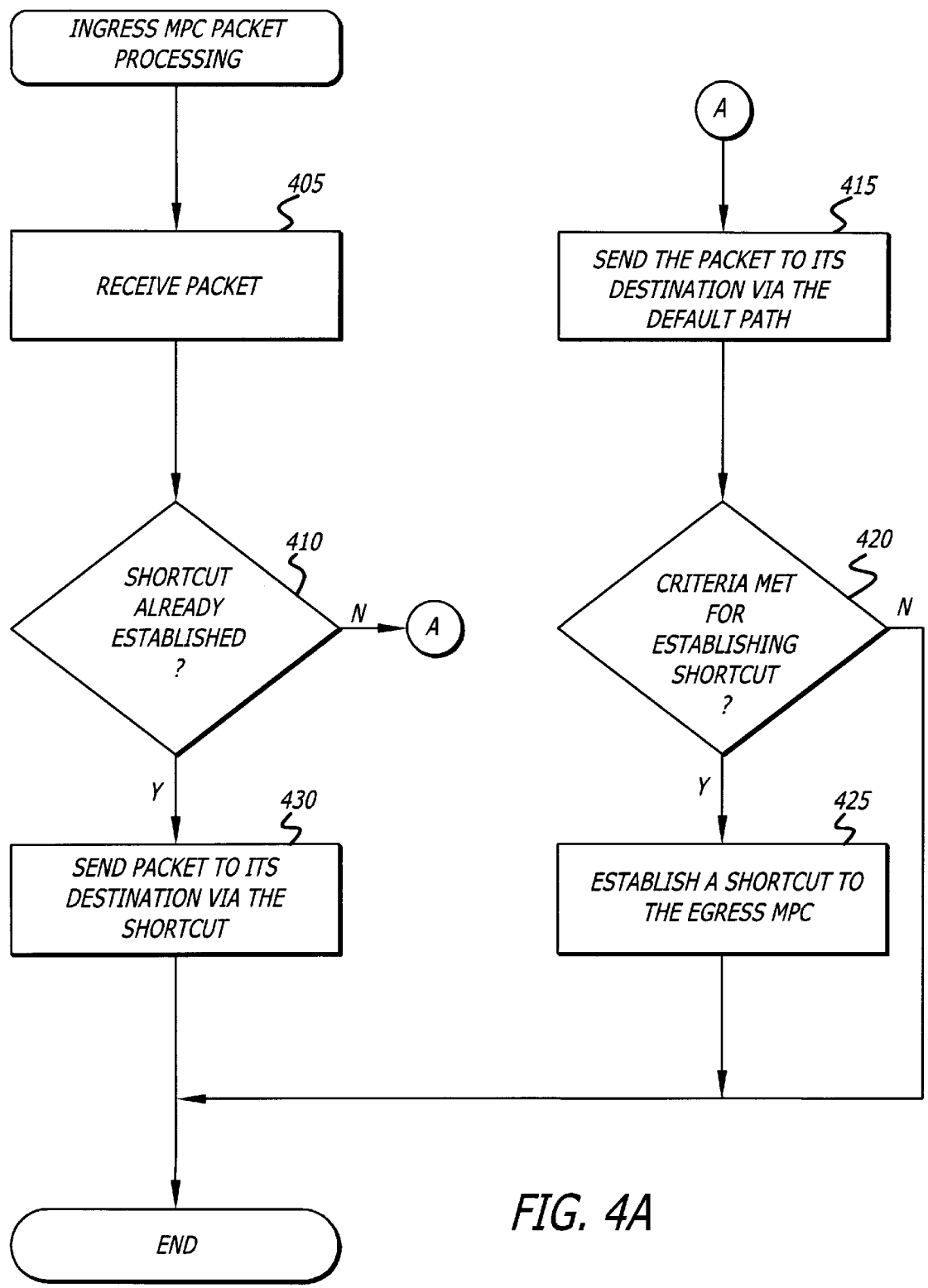
FIG. 4A is a flow diagram illustrating high level Ingress MPOA Client packet processing according to one embodiment of the present invention.

FIG. 4A is a flow diagram illustrating high level I-MPC packet processing according to one embodiment of the present invention. At step 405, a packet is received by the I-MPC from a LAN port of the network device. At step 410, the I-MPC determines whether or not a shortcut virtual channel connection (VCC) has already been established between the I-MPC and the E-MPC by inspecting the I-Cache, for example. If a shortcut VCC exists, processing of the packet continues at step 430 where the packet is sent to its destination via the shortcut. Otherwise, at step 415, the packet is forwarded to the destination over the default path. At step 420, a determination is made whether or not to establish a shortcut between the I-MPC and the E-MPC. If the criteria for establishing a shortcut have not been met, then processing of the packet is complete. If, however, the criteria are met, then at step 425 shortcut establishment is initiated. Of course, it is appreciated that additional processing may be performed by the MPC. For example, prior to forwarding a packet over either the default path or the shortcut, various test are typically performed to establish that the packet can be forwarded, e.g., IP time to live (TTL) not expired, valid checksum, etc. However, such additional processing is not necessary to understanding the present invention.

Figure 4B:
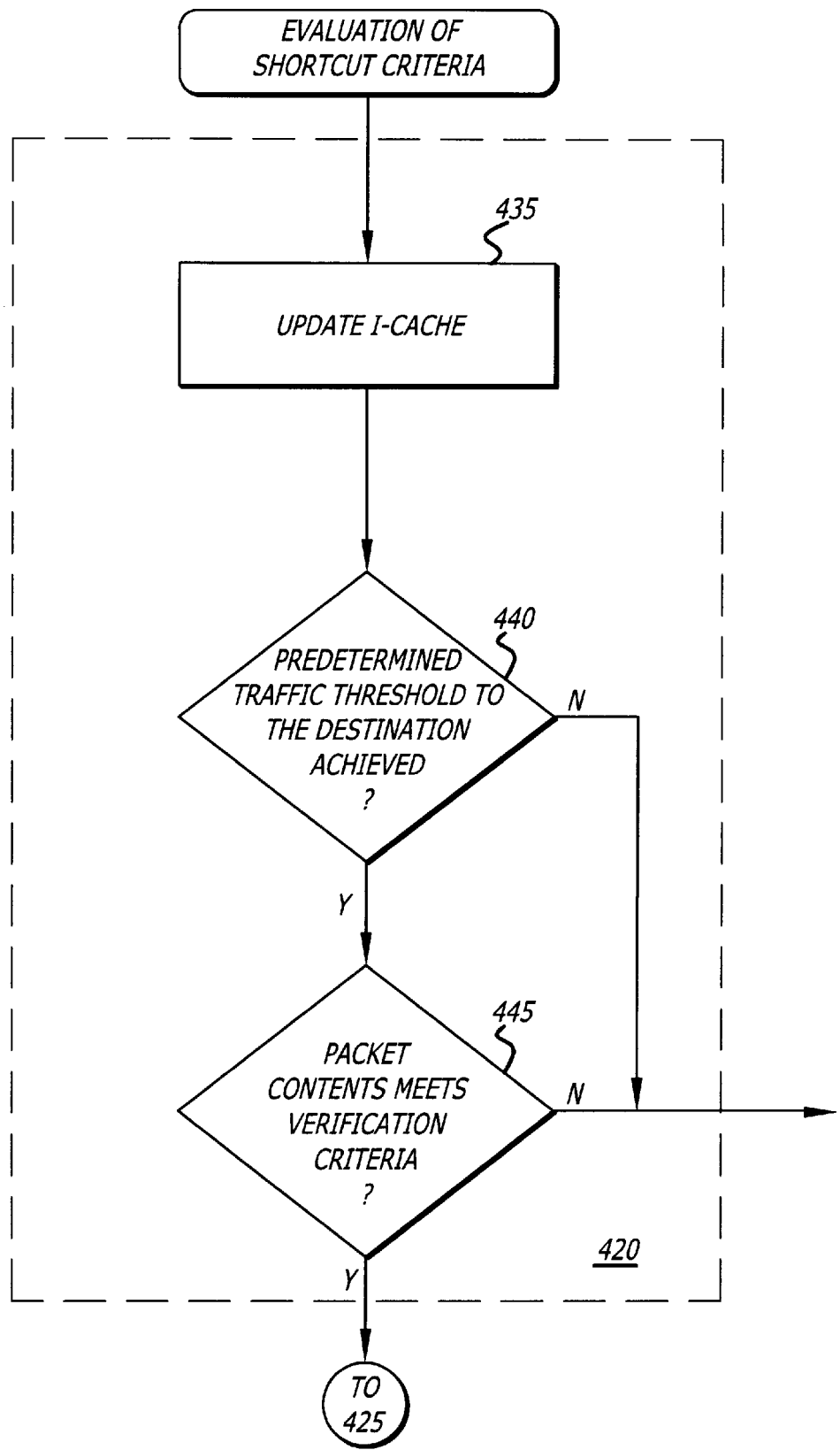
FIG. 4B is a flow diagram illustrating the shortcut criteria evaluation of FIG. 4A according to one embodiment of the present invention.

Shortcut criteria evaluation, according to one embodiment of the present invention, will now be described with reference to FIG. 4B. At step 435, the I-Cache is updated. If an I-Cache miss occurred at step 410, this may involve adding a new entry to the I-Cache and initializing the packet count, for example. If an I-Cache entry already exists, the entry's packet count is updated to record the current packet. It is appreciated that the packet count may be implemented as either an up or down counter. In the case of the former, the packet count is initialized to one, while in the case of the latter, the packet count is initialize to a predetermined threshold value.

According to this embodiment, after the I-Cache has been updated a test is performed at step 440 to determine if sufficient traffic has been forwarded to the destination to justify establishment of a shortcut. For example, the packet count maintained in the I-Cache entry, corresponding to the MAC/internetwork address pair in the packet, may be examined to determine if it has been incremented beyond the predetermined threshold value or decremented to zero. Regardless of the method of packet counting, if enough traffic has been forwarded to the destination within a predetermined time, shortcut criteria evaluation processing continues at step 445. Additional verification processing, employing criteria provided by the network administrator, for example, are then performed in order to determine whether or not control plane processing (e.g., shortcut resolution and VCC establishment) is to be performed for this flow. However, if the predetermined traffic threshold has not been achieved, then further verification processing is unnecessary and step 445 is bypassed. As a result, no verification processing is performed until at least the requisite traffic threshold has been achieved.

Thus, in this embodiment, the additional verification criteria (e.g., step 445) acts as a filter for flows that have been detected by the flow threshold detection processing (e.g., steps 435 and 440). Advantageously, in this manner, control plane processing may be avoided for those flows that do not meet one or more additional criteria while other flows are permitted to establish VCCs.

Figure 4C:
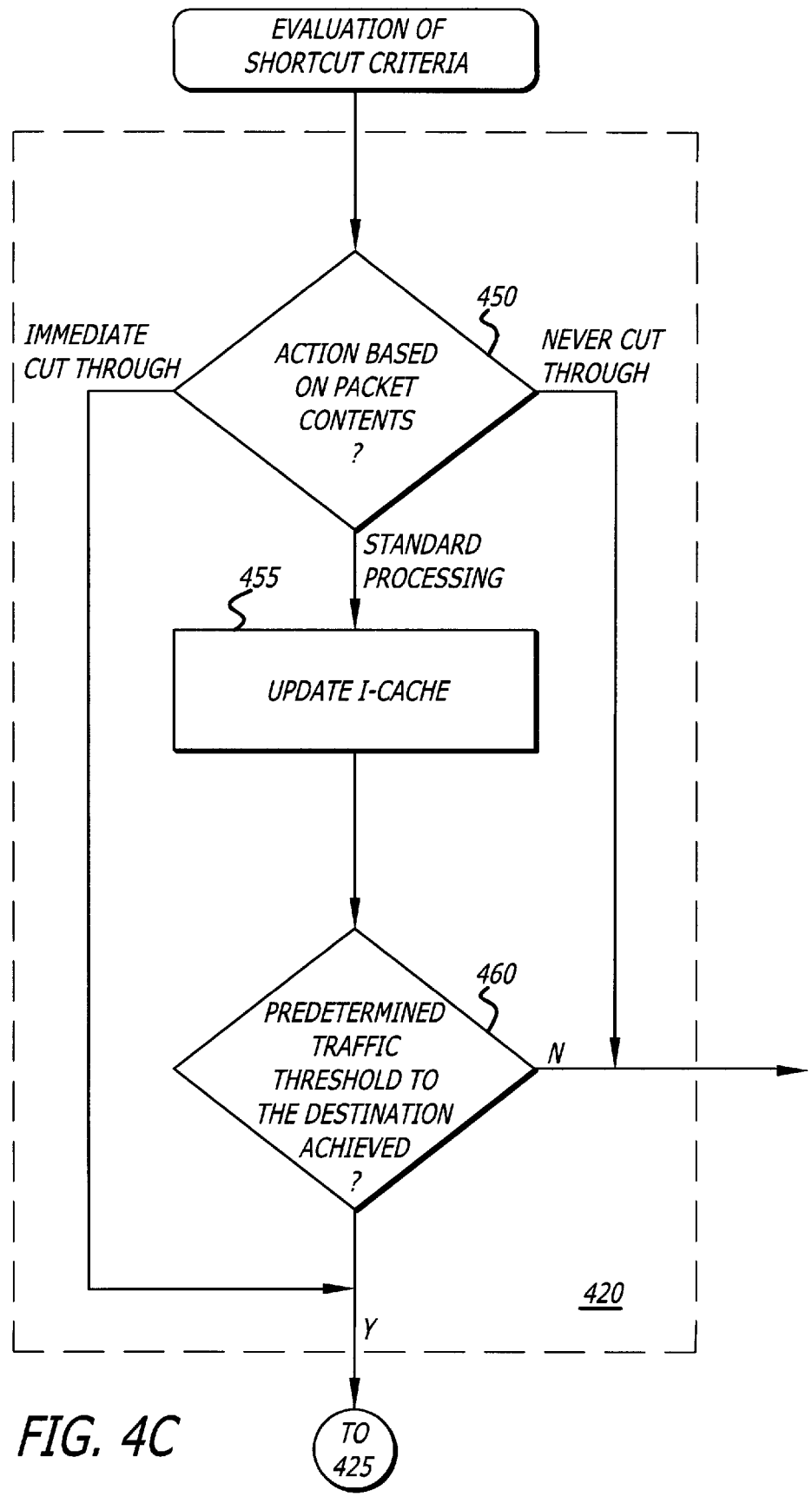
FIG. 4C is a flow diagram illustrating the shortcut criteria evaluation of FIG. 4A according to another embodiment of the present invention.

Shortcut criteria evaluation, according to another embodiment of the present invention, will now be described with reference to FIG. 4C. In this embodiment, an additional layer of packet processing precedes the flow threshold detection processing. In this manner, one of a plurality of flow threshold detection mechanisms may be selected based upon the packet's content. For example, flow detection may be bypassed, modified, or simply performed in the standard manner. At step 450, the action to be taken for the current packet is determined with reference to the packet's content. As described above, various portions of the packet may be checked against criteria specified by a verification table, for example. According to the embodiment depicted, the results of these initial tests determine the remainder of the shortcut criteria evaluation processing.

If the current packet is representative of the type of traffic that is to immediately establish a shortcut VCC, then processing branches to step 425. Thus, certain types of traffic may be immediately cut through regardless of the packet count. However, if the packet is representative of the type of traffic that is prohibited from establishing shortcuts, then flow detection processing is bypassed.

Continuing the discussion of step 450, a third path causes the standard flow detection processing to be performed by proceeding to step 455. Packets that follow this path through the shortcut criteria evaluation processing are those that are not associated with types of traffic that receive special processing. At any rate, at step 455, the I-Cache is updated as described above. Then, at step 460, it is determined whether or not a flow is justified.

Advantageously, in this embodiment, flow threshold detection processing (e.g., steps 455 and 460) may be reduced for special types of traffic. It is appreciated that in alternative embodiments, rather than bypassing the standard flow detection processing, flow detection may be delayed or accelerated by manipulating the packet count, for example.

Alternative Embodiments

Many alternative embodiments are contemplated by the inventors of the present invention. For example, control plane processing may be reduced by performing verification processing on either the I-MPS or the E-MPC.

Figure 5A:
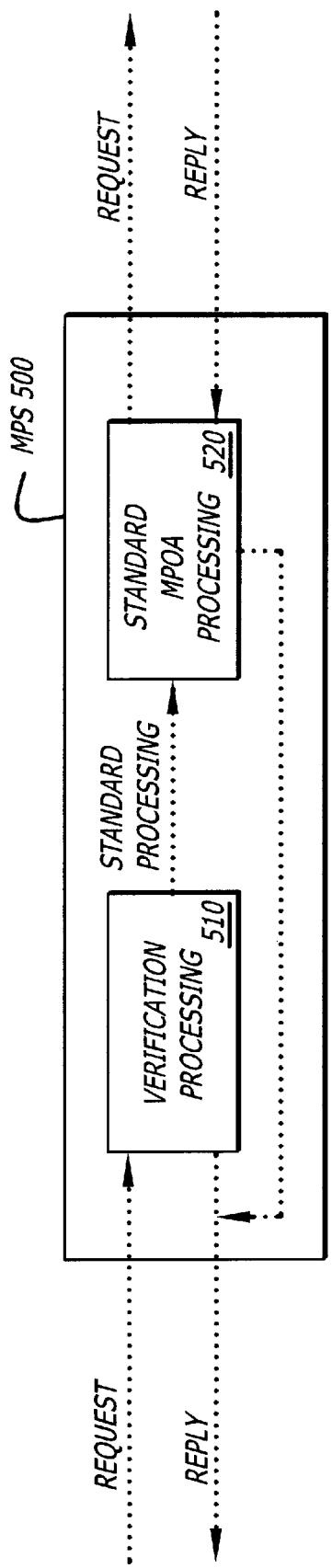
FIG. 5A is a block diagram that conceptually illustrates the interaction between various MPOA Server processing blocks according to one embodiment of the present invention.

FIG. 5A is a block diagram that conceptually illustrates the interaction between various MPOA Server processing blocks according to one embodiment of the present invention. In this example, certain MPOA requests may be immediately rejected by verification processing 510 in the MPS 500 or the MPOA requests may be processed in the standard manner by block 520. As above, verification processing 510 may employ a verification table supplied by the network administrator. Providing the network administrator with the ability to cause immediate rejection of certain MPOA requests may enhance network security by denying certain users or types of traffic access to shortcuts. Additionally, a significant amount of control plane processing may be avoided by providing a mechanism that allows shortcut resolution and the resultant VCC establishment to be abandoned.

Figure 5B:
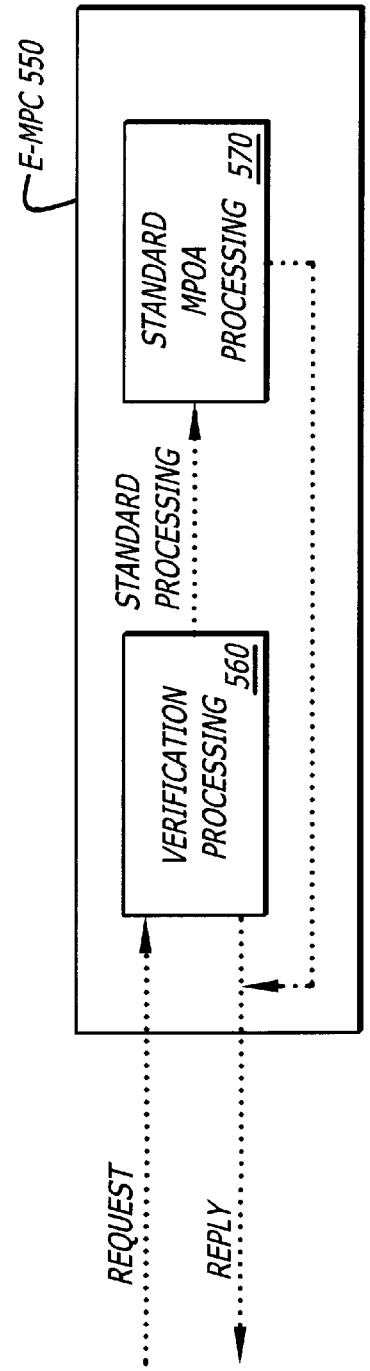
FIG. 5B is a block diagram that conceptually illustrates the interaction between various Egress MPOA Client processing blocks according to one embodiment of the present invention.

FIG. 5B is a block diagram that conceptually illustrates the interaction between various Egress MPOA Client processing blocks according to one embodiment of the present invention. In a manner similar to that described above, verification processing 560 may selectively reject certain MPOA requests based upon rules, conditions, or filters supplied by the network administrator, thereby allowing the network administrator to retain control over shortcut resolution and VCC establishment.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:

receiving a packet at a first Multi-protocol Over ATM (MPOA) client (MPC), the packet destined for a host which is associated with a second MPC;

selecting among a plurality of flow detection mechanisms based upon the packet's content to accomplish flow threshold detection before a virtual channel connection (VCC) is established, the plurality of flow detection mechanisms including standard MPOA processing and modified flow detection processing for delaying, by passing, or accelerating flow threshold detection; and performing flow threshold detection processing to determine whether or not the packet justifies establishing a virtual channel connection (VCC) between the first MPC and the second MPC.

2. The method of claim 1, wherein the standard MPOA processing comprises flow threshold detection as described in Multi-Protocol Over ATM Version 1.0.

3. The method of claim 2, wherein the modified flow detection processing includes bypassing the flow threshold detection.

4. A method comprising:

receiving a packet at a first Multi-protocol Over ATM (MPOA) client (MPC), the packet destined for a host which is associated with a second MPC;

selecting among a plurality of flow detection mechanisms based upon the packet's content to accomplish flow threshold detection before a virtual channel connection (VCC) is established, the plurality of flow detection mechanisms including standard MPOA processing and modified flow detection processing for delaying, bypassing, or accelerating flow threshold detection;

performing flow threshold detection processing to determine whether or not a stream of data with which the packet is associated justifies establishing a virtual channel connection (VCC) between the first MPC and the second MPC; and after determining that establishing the VCC is justified, allowing or disallowing the transmission of a resolution request based upon the packet's content.

5. The method of claim 4, wherein allowing or disallowing the transmission of a resolution request is based upon an internetwork address in the packet.

6. The method of claim 4, wherein allowing or disallowing the transmission of a resolution request is based upon a subnet with which the packet is associated.

7. The method of claim 6, wherein the subnet comprises a destination Internet Protocol (IP) subnet address.

8. The method of claim 6, wherein the subnet comprises a source Internet Protocol (IP) subnet address.

9. The method of claim 6, wherein the subnet comprises a destination Internetwork Packet Exchange (IPX) address.

10. The method claim 6, wherein the subnet comprises a source Internetwork Packet Exchange (IPX) address.

11. The method of claim 4, wherein allowing or disallowing the transmission of a resolution request is based upon a media access control (MAC) address associated with the packet.

12. The method of claim 11, wherein the MAC address is a source MAC address.

13. The method of claim 11, wherein the MAC address is a destination MAC address.

14. A method of reducing control plane processing in a Multiprotocol Over ATM (MPOA) system, the method comprising:
   receiving a packet at a first MPOA client (MPC), the packet destined for a host which is associated with a second MPC;
   selecting among a plurality of flow detection mechanisms based upon the packet's content to accomplish flow threshold detection before a virtual channel connection (VCC) is established, the plurality of flow detection mechanisms including standard MPOA processing and modified flow detection processing for delaying, bypassing, or accelerating flow threshold detection:
   performing flow threshold detection processing to determine whether or not the packet justifies resolving a shortcut and establishing a virtual channel connection (VCC) between the first MPC and the second MPC; and
   after performing flow threshold detection processing and determining that the VCC is justified, suppressing a resolution request for an identified flow based upon the packet's content.

15. The method of claim 14, wherein a device upon which the first MPC resides includes a verification table, and the method further comprises:
   determining whether of not to suppress the resolution request by comparing the packet's content to one or more entries from the verification table; and
   suppressing the resolution request if the identified flow corresponds to an entry of the one or more entries.

16. The method of claim 14, wherein a device upon which the first MPC resides includes a verification table, and the method further comprises:
   determining whether of not to suppress the resolution request by comparing the packet's content to entries from the verification table; and
   suppressing the resolution request if the identified flow does not correspond to an entry of the verification table.

17. A packet forwarding device comprising:
   a plurality of ports; and
   an address resolution unit coupled to the plurality of ports to receive packets, to select among a plurality of flow detection mechanisms based upon the packet's content to accomplish flow threshold detection before a virtual channel connection (VCC) is established, and to perform flow threshold detection processing including examining a packet to determine whether establishing a virtual channel connection (VCC) between a first MPOA client (MPC) and a second MPC is justified, where existence of a flow is determined by a flow detection mechanism of the plurality of flow detection mechanisms which operates in a plurality of modes based upon the packet's content to accomplish flow threshold detection, the plurality of modes including a first flow detection mode and a second flow detection mode, the first flow detection mode corresponding to a standard MPOA processing procedure and the second flow detection mode corresponding to a modified flow detection procedure, the modified flow detection procedure for delaying, bypassing, or accelerating flow threshold detection.

18. The packet forwarding device of claim 17, wherein the address resolution unit comprises a processor.

19. The packet forwarding device of claim 17, wherein the address resolution unit comprises an application specific integrated circuit (ASIC).

20. The packet forwarding device of claim 17, wherein the address resolution unit comprises programmable logic.

21. The packet forwarding device of claim 17, wherein the shortcut includes a first protocol entity at a first end and a second protocol entity at a second end.

22. The packet forwarding device of claim 21, wherein the first protocol entity comprises an ingress Multi-protocol Over ATM (MPOA) client (I-MPC) and the second protocol entity comprises an egress MPOA client (E-MPC).

23. The packet forwarding device of claim 17, wherein the first flow detection mode operates in accordance with flow threshold detection described in Multi-Protocol Over ATM Version 1.0.

24. The packet forwarding device of claim 17, wherein the second flow detection mode bypasses flow threshold detection.

25. The packet forwarding device of claim 17, wherein the second flow detection mode suppresses resolution requests for a subset of flows identified by the first flow detection mode.

26. A packet forwarding device comprising:
   a storage device having stored therein a flow threshold detection routine for detecting a flow between a first Multi-protocol Over ATM (MPOA) client (MPC) and a second MPC in an MPOA system;
   a processor coupled to the storage device for selecting among a plurality of flow detection mechanisms based upon the packet's content to accomplish flow threshold detection before a virtual channel connection (VCC) is established, executing the flow threshold detection routine to perform flow threshold detection processing including examining a packet to determine whether establishing a virtual channel connection (VCC) between the first MPC and the second MPC is justified, where existence of a flow is determined by one of the plurality of flow detection mechanisms to accomplish flow threshold detection, the plurality of flow detection mechanisms including standard MPOA processing and modified flow section processing, the modified flow detection processing for delaying, bypassing, or accelerating flow threshold detection.

27. The packet forwarding device of claim 26, wherein the standard MPOA processing comprises flow threshold detection as described in Multi-Protocol Over ATM Version 1.0.

28. The packet forwarding device of claim 27, wherein the modified flow detection processing bypasses the flow threshold detection.

29. The packet forwarding device of claim 27, wherein the modified flow detection processing suppresses resolution requests for a subset of flows identified by the flow threshold detection.

30. The packet forwarding device of claim 29, wherein the storage device includes a verification table, and the modified flow detection processing suppresses resolution requests for those of the flows identified by the flow threshold detection that correspond to an entry of the verification table.

31. The packet forwarding device of claim 29, wherein the storage device includes a verification table, and the modified flow detection processing suppresses resolution requests for those of the flows identified by the flow threshold detection that do not correspond to an entry of the verification table.

32. A method of reducing flow detection processing in a Multiprotocol Over ATM (MPOA) system, the method comprising:

a first MPOA client (MPC) receiving a packet destined for a host which is associated with a second MPC, the first MPC configured to select among a plurality of flow detection mechanisms based upon the packet's content to accomplish flow threshold detection before a virtual channel connection (VCC) is established and to perform one or more tests to determine whether or not the packet establishes a flow between the first MPC and the second MPC;

the first MPC performing a first test based on the packet's contents, the first test indicating whether or not to perform flow detection processing for the packet;

if flow detection processing is to be performed, then performing flow threshold detection processing to determine whether or not the packet justifies establishing a virtual channel connection (VCC) including performing a second test by updating a count associated with the host, and comparing the count to a predetermined threshold; and otherwise, bypassing the second test to avoid unnecessary flow detection processing; if the predetermined threshold has been achieved, the first MPC subsequently determining whether or not the packet meets one or more predetermined criteria; and establishing a shortcut virtual channel connection (VCC) from the first MPC to the second MPC if it was determined that both the predetermined threshold has been achieved, and the packet meets the one or more predetermined criteria.

33. The method of claim 32, wherein the first MPC and the second MPC are co-located.

34. The method of claim 32, wherein the first MPC and the second MPC reside on separate devices.

35. The method of claim 5, wherein the internetwork address comprises a destination Internetwork Packet Exchange (IPX) address.

36. The method of claim 5, wherein the internetwork address comprises a source Internetwork Package Exchange (IPX) address.

* * * * *